United States Patent [19]
Lee

[11] Patent Number: 5,886,748
[45] Date of Patent: Mar. 23, 1999

[54] EQUALIZING METHOD AND EQUALIZER USING REFERENCE SIGNAL

[75] Inventor: Myeong-hwan Lee, Suwon, Rep. of Korea

[73] Assignee: Samsung Electronics Co., Ltd., Kyungki-do, Rep. of Korea

[21] Appl. No.: 770,829

[22] Filed: Dec. 20, 1996

[30] Foreign Application Priority Data

Jan. 9, 1996 [KR] Rep. of Korea .......................... 96-309

[51] Int. Cl.$^6$ ..................................... H04N 5/21
[52] U.S. Cl. ............................................. 348/614; 348/21
[58] Field of Search ............................. 348/614, 21, 607; 455/63, 65, 67.3, 67.4; 358/905; H04N 5/21

[56] References Cited

U.S. PATENT DOCUMENTS

| | | | |
|---|---|---|---|
| 5,111,298 | 5/1992 | Koo ........................................ | 348/614 |
| 5,161,017 | 11/1992 | Sato ........................................ | 348/614 |
| 5,321,512 | 6/1994 | Huang ..................................... | 348/614 |
| 5,512,959 | 4/1996 | D'Alto et al. .......................... | 348/614 |

FOREIGN PATENT DOCUMENTS

A2 0 677 952  10/1995  European Pat. Off. ......... H04N 5/21

*Primary Examiner*—David E. Harvey
*Attorney, Agent, or Firm*—Sughrue, Mion, Zinn, Macpeak & Seas, PLLC

[57] ABSTRACT

An equalizing method and device for equalizing a received signal by renewing a filtering coefficient of a filter in an off-line system using a pre-stored reference signal. It is first determined whether or not a signal input to a high definition TV (HDTV) includes a field sync or not. If so, the detected field sync is stored in a memory as a training sequence. A filtering coefficient is calculated according to a predetermined algorithm, and a symbol error rate (SER) is calculated using the pre-stored reference signal. The filtering coefficient is transmitted to the filter when the calculated SER is lower than a predetermined value. The process of calculating the filtering coefficient, determining the level of the training sequence, and transmitting the filtering coefficient is repeated until a loop variable equals a loop constant, which indicates the number of off-line operations capable of being performed in a field, while increasing the loop variable when the calculated SER obtained is greater than or equal to the predetermined value.

24 Claims, 7 Drawing Sheets

5,886,748

EQUALIZING METHOD AND EQUALIZER USING REFERENCE SIGNAL

BACKGROUND OF THE INVENTION

The present invention relates to an equalizing method and an equalizer using a reference signal, and more particularly, to an equalizing method and an equalizer using a reference signal for efficiently removing or reducing multipath distortion in a digital signal demodulating system.

The current trend in the television market is to pursue large scale, realistic, and high definition TV. The Japanese are using high definition TV (HDTV) based on multiple subnyquist sampling encoding (MUSE) which is an analog transmitting method, the US has adopted the GA-HDTV system proposed by the Grand Alliance (GA), and some cable TV companies are interested in quadrature amplitude modulation (hereinafter referred to as QAM) as a digital transmission method.

Because the GA-HDTV adopts digital vestigial side band (hereinafter referred to as VSB) modulation, it is referred to as a GA-VSB type receiver. Here, VSB is used as an analog image signal modulation method in a conventional TV, and for digital signal modulation in the GA-HDTV. In the early digital spectrum compatible-TV (hereinafter referred to as DSC-TV) 2-VSB and 4-VSB were adapted using two and four levels, respectively, as its modulation method. However, the GA-HDTV adopts 8-VSB for terrestrial broadcast mode using 8-levels and 16-VSB for high speed cable mode using 16-levels as its modulation method.

The GA has proposed a schematic constitution of a receiver for demodulating such VSB signals, and the characteristics of the proposed receiver are as follows. First, the VSB receiver, different from other demodulators, detects data using only the In-phase channel (I-channel) signals and performs sampling according to a symbol rate. Therefore, the VSB receiver design is more simple than a QAM receiver which uses quadratrure channel (Q-channel) and I-channel at the same time, and the VSB receiver detects data at a relatively slow processing speed because, unlike a fractional rate receiver, it processes data at a symbol rate. Moreover, the proposed VSB receiver adopts coherent detection for demodulating modulated signals by reproducing carriers from the receiver for detecting digital data. Compared with incoherent detection, coherent detection is advantageous in that it can reliably detect data having the same signal-to-noise ratio, but the receiver design becomes more complicated due to the carrier reproduction circuit. Therefore, the proposed VSB receiver adopts two-step coherent phase detection using a frequency and phase locked loop (FPLL) and a phase tracking loop (PTL) to detect the phase of a transmitted signal.

The FPLL uses a pilot signal included in the VSB signal for estimating the phase of a transmitted VSB signal. Such a FPLL can easily be established using a conventional frequency error detecting circuit, and its constitution and efficiency is disclosed in document [1]: [1] R. Citta, "Frequency and Phase Lock Loop", IEEE Trans, on Consumer Electronics, vol, CE-23, no.3, pp.358–365, Aug. 1977.

The output of the FPLL is transmitted to the PTL via a channel equalizer, and the PTL functions to remove residual phase noise, i.e., phase error, from the output signal.

The GA-HDTV receiver constitution is nearly the same as a decision directed carrier recovery (DDCR) receiver disclosed in document [2]: [2] E. A. Lee and D. G. Messerschmitt, Digital Communication, Kluwer Academic Publishers, Boston, Mass., 1988, but different in that it estimates the rotating components of signal points using only I-channel sampled data and compensates phase error values based on the result.

FIG. 1 is a block diagram showing the constitution of a GA-HDTV receiver, which will be used to describe the VSB type GA receiver. This block diagram is disclosed in document [3]: [3] Grand Alliance HDTV System Specification, submitted to the ACATS Technical Subgroup, Feb. 1994.

In FIG. 1. a tuner 102 selects a desired channel signal among the HDTV signals received via an antenna. Generally, the output of the tuner 102 is a modulated HDTV signal having a 44 MHZ central frequency and a 6 MHZ bandwidth. However, the output of the tuner 102 is not superior in its inner filter characteristic and thus it passes not only the 6 MHZ band of HDTV signals but also a portion of the neighboring channel signals.

Because the neighboring channel signals cause interference in the desired channel signal, the output of the tuner 102 passes through a surface acoustic wave (SAW) filter 104 whose band width is precisely 6 MHZ.

An intermediate frequency (hereinafter referred to as IF) amplifier 106 maintains the input signal of an analog-to-digital (A/D) converter 112 at a proper level, and its gain is controlled by an auto gain control signal output from an auto gain control (hereinafter referred to as AGC) circuit 110.

Here, the proper level means 8-levels (±1, ±3, ±5, ±7) to which is added a DC offset of 1.25, i.e., −5.75, −3.75, −1.75, 0.25, 2.25, 4.25, 6.25, 8.25.

The tuner 102 includes a high frequency amplifier (hereinafter referred to as an RF amplifier) therein, and thus if the gain of the IF amplifier is not sufficient, the gain of the RF amplifier is sufficiently regulated to match the signal being amplified according to the AGC signal.

By the way, the restoration of the carrier is performed by an FPLL circuit 108, which traces the pilot signals added to the output signal of the IF amplifier 106 and regulates the local oscillation frequency of the tuner 102 so that the pilot signal frequency is zero Hz. As a result, the FPLL circuit 108 restores the carrier and multiplies the restored carrier by the output of the IF amplifier 106 to demodulate it as a baseband signal.

The A/D converter 112 samples the output of the FPLL circuit 108 according to the symbol clock signal restored by a symbol timing and field sync restorer 114, and converts the sampled data to digital data.

The symbol timing and field sync restorer 114 generates symbol clock pulses for controlling the sampling timing of the A/D converter 112, supplies the field sync reference signals stored therein to an NTSC detector 116, restores the field sync by comparing the field reference signals with the field sync transmitted to each field, generates the operation clock signal for the entire system, and supplies a field sync control signal to an equalizer 120.

Referring to FIG. 2, showing a VSB data frame format of a GA-HDTV, the VSB data frame is constituted of two fields, each field constituted of one field sync segment and 312 data segments, and each data segment is constituted of four symbols for segment sync and 828 symbols for data and forward error correction (FEC) code.

Moreover, the segment sync is inserted in the eight-level digital data stream at the beginning of each data segment. Here, the segment sync constitutes a regular pattern of four symbols having +5, −5, −5, and +5 signal levels, respectively, and the other data is randomly constituted of the eight levels. Because the segment sync is a binary number (binary level) and should ensure its own stability without interfering with the NTSC signals of the co-channel, its level is determined to be ±5.

Additionally, a field sync segment, the first segment of each field, contains a field sync signal for indicating the initiation of a field (FIELD SYNC #1, and FIELD SYNC #2) therein.

FIG. 3 shows the VSB data field sync format of a GA-HDTV.

As shown in FIG. 3, the field sync segment is constituted of 832 symbols, the segment sync constitutes the first four symbols thereof, pseudo number PN 511 constitutes the following 511 symbols, three PN 63's constitute the following 189 symbols, and 24 symbols indicating 2-VSB, 4-VSB, 8-VSB, and 16-VSB modes and other information (104 symbols) constitute the remaining 128 symbols.

Here, PN 511, a predetermined signal sequence which is indicated as +5 and −5 levels, is used as a training sequence for equalizing, and the three PN 63 sequences are used as a field discriminating signal because the phase of the second PN 63 is reversed in every other field.

Referring to FIG. 1, the NTSC detector 116 including an NTSC removing filter (hereinafter referred to as NRF) filters out carrier components of the NTSC signals from the output of the A/D converter 112 for preventing the HDTV broadcast from being deteriorated under channel coherent circumstances when the HDTV and NTSC are simultaneously broadcast.

A DC offset remover 118 removes the DC offset which is due to the non-linearity of the pilot signal and the A/D converter 112 from the digital signals converted in the A/D converter 112.

That is, a small digital DC level (1.25) is transmitted while being added to the four symbol data segment sync having signal levels of +5, −5, −5, and +5 and the 828 symbol data having random levels among the eight levels (±1, ±3, ±5, ±7), and which has the same effect as the pilot signal is added to the data signal. Moreover, the input and output of the A/D converter 112 show non-linear characteristics.

Therefore, the DC offset (1.25) due to the pilot signal and the DC offset due to the non-linearity of the A/D converter 112 should be removed so that an HDTV signal having an original signal level can be restored in a receiver. Accordingly, the DC offset remover 118 removes the DC offset by detecting the mean DC offset of the field sync, and subtracting the DC offset detected in the output of the NTSC detector 116 therefrom. Here, the DC offset is calculated by taking an average of the field sync in the unit of a frame because, e.g., the phase of the second PN 63 among the 189 symbols used as a field discriminating signal as shown in FIG. 3 is reversed in every other field and the absolute values thereof are the same.

The equalizer 120 removes the multipath distortion, in other words multipath noise, due to the transmitting signal passing through the transmission channel. Such multipath distortion results in a multipath channel due to wave deflection off a mountain, a group of buildings, or an airplane during terrestrial broadcasting. The multipath distortion causes delayed and attenuated image signals to be overlapped with the original signal, and distorts the frequency characteristics of the HDTV signal as well. A more detailed description of the NTSC detector 116 and the equalizer 120 will be given with reference to FIG. 4.

In the transmitter, a signal is modulated using Read-Solomon (hereinafter referred to as "RS") coding, an interleaving process, and trellis coded modulation (TCM) before transmission to reduce symbol errors generated during transmission. When the decoder receives a signal from the transmitter, a PTL 122 compensates for that portion of the phase error not completely corrected in the FPLL 108 and a channel decoder 124 decodes the signal received from the PTL 122.

The channel decoder 124 performs trellis decoding on the output of the PTL 122, deinterleaves the trellis decoded data, and error correction decodes the deinterleaved data.

The source decoder 126 variable length decodes the error correction decoded data output from the channel decoder 124, inverse quantizes the variable length decoded data, inverse discrete cosine transforms (IDCT) the inverse quantized data, decompresses the compressed data to restore the original data, and displays it on a display (not shown).

FIG. 4 shows a detailed partial block diagram of a conventional HDTV receiver of a GA-VSB type, and the constitution thereof is described in the above document [3].

During simultaneous broadcasting of the NTSC and HDTV signals, e.g., when ATV (Advanced Television) and DVB (Digital Video Broadcasting) signals are included, the NTSC signal has a regular carrier frequency offset (about 0.89 MHZ) compared to the VSB signal. Thus, considered to be in base band, the NTSC signal is the same as a modulated carrier frequency corresponding to the frequency offset. Here, most of the NTSC signal energy is concentrated on the original DC component, i.e., the modulated carrier. Thus, when the NTSC mixing components pass through the NRF 204 of the NTSC detector 116, the modulated carrier component is removed and thus the NTSC signal effect on the HDTV signal is decreased.

The NTSC detector 116, using the reference signal, compares the field sync reference signal stored in the symbol timing and field sync demodulator 114 with the field sync output from the A/D converter 112, and determines whether the NTSC signal is mixed with the VSB signal using the accumulated values of the squared difference values.

In other words, the NTSC detector 116 is constituted of an original path through a mixer 201, a squaring circuit 202, and an integrator 203 for comparing the field sync reference signal output from the symbol timing and field sync restorer 114 with the field sync output from the A/D converter 112, and calculating the value of the accumulated squared result of the comparison, a path through the NRF 204, the NRF 205, a mixer 206, a squaring circuit 207, and an integrator 208 for comparing between the field sync output from the A/D converter 112 via NRF 204 and the field sync reference signal output from the symbol timing and field sync restorer 114 via the NRF 205, and calculating the value of the accumulated squared result of the comparison, a least error detector 209 for detecting and outputting the NTSC mixing HDTV channel components by comparing between the two path values, and a multiplexer 210 for selecting I-channel symbol data of the A/D converter 112 output via the NRF 204 or I-channel symbol data output directly from the symbol timing and field sync restorer 114 by using the detection signal output from the least error detector 209 as a selection control signal.

Here, the least error detector 209 generates an NRF controlling (NRF CON) signal for indicating whether or not the output of the A/D converter 112 follows the NRF 204 path in the NTSC detector 116, and transmits the NRF CON signal to a memory 216 of the equalizer 120 and a filter coefficient calculator 217.

The equalizer 120 is constituted of an L1 (herein 78) tab filter 211 as a forward transversal filter, an L2 (herein 177)

tab filter 212, a subtractor 213 for subtracting the output of the L2 tab filter 212 from the output of the L1 tab filter 211, a slicer 214 for selecting the output level of the subtractor 213 from among the predetermined eight levels (±1, ±3, ±5, ±7), a controlling switch 215 for supplying random data to L2 tab filter 212 during a data segment term and the training sequence to the memory 216 during the field sync segment term, the memory 216 for storing the training sequence inserted into the field sync segment output from the slicer 214 in every field according to the NRF controlling signal (NRF CON) of the least error detector 209, and the filtering coefficient calculator 217 for performing an equalizing process by renewing the filtering coefficients of the L1 tab filter 211 and the L2 tab filter 212 using the training sequence output from the subtractor 213 during the field sync segment term and outputting random data in a previous filtered state during the coefficient renewal term so that high speed tracking of a moving ghost signal can be possible. Such an equalizer is called a decision-feedback equalizer (DFE).

The filter coefficient calculator 217 calculates the filtering coefficients using a least mean square (LMS) algorithm in order to reduce the effect of noise on the training sequence used for coefficient renewal. During the coefficient renewal, a mean value is taken in every frame because the VSB signal has a different training sequence phase in every field. So, in this embodiment, the mean value is taken in a frame unit because in the second PN 63, the phase is reversed in every field of the field sync, as shown in FIG. 3. To use field mean, PN 511 and a first PN63 can be used. The LMS algorithm will be described later.

Additionally, the DC offset remover 118 filters out the DC offset by subtracting the DC offset transmitted from the filtering coefficient calculator 217 from the output of the NTSC detector 116. That is, because the field sync is transmitted with the DC offset (1.25) being added thereto, the filter coefficient calculator 217 obtains the DC offset value by taking the mean value of the first and second field syncs (FIELD SYNC #1, FIELD SYNC #2) and transmits it to the subtractor 118.

The equalizer 120 can use the reference signal transmitted in every field, random data and its error, or both at the same time. The equalizer shown in FIG. 4 uses both, i.e., the reference data and the random data. When the reference data is used, the coefficients of the tab filters 211 and 212 are to be adopted using the LMS algorithm.

Such an LMS algorithm is widely used and the basis thereof is to minimize the mean square error. When the input and output of the equalizer 120 are x(n) and z(n), respectively, the reference signal determining level is d(n), and the filtering coefficient is $w_i$, $$z(n) = W^T(n-1)X^T(n) \quad (1)$$

$$e(n) = d(n) - z(n) \quad (2)$$

$$W(n) = W(n-1) + 2\mu \cdot e(n)X(n) \quad (3)$$

where, $X^T(n) = [X(n), X(n-1), \ldots, X(n-N+1)]$, $W^T = [W_0, W_1, \ldots, W_{N-1}]$ i=0, 1, ..., N-1, $\mu$ is constant and N is the tab number of the filter.

The LMS algorithm operates to minimize $E[e^2(n)]$ and can be adapted to both an on-line system using input data continuously and an off-line system for storing data of a predetermined term in a memory.

In a conventional equalizer, considering the complicated calculation, hardware load, speed, etc., an off-line system is widely adapted rather than an on-line system.

Such an off-line system is also used in a ghost canceler for an NTSC broadcasting and is presently produced on a commercial scale. This ghost canceler is shown in document [4]: K. B. Kim, J. Oh, M. H. Lee, H. Hwang, and D. I. Song, "A New Ghost Cancellation System for Korean GCR," IEEE Trans. on Broadcasting, vol.40, no.3, pp.132–140, Sep. 1994.

The advantages of the off-line system are that it has a high convergent speed due to the predetermined reference signal, and that it can be constructed using a special hardware H/W clock rate, i.e., a clock which is slower than the system clock, considering the H/W speed.

Such an off-line system needs a method for controlling renewal of the filtering coefficients according to the degree of convergence of the LMS algorithm. A general LMS algorithm adopts a mean square error (MSE) detecting method, and the ghost canceler adopts a method for detecting the remaining peak value of a ghost signal using the characteristic of the auto correlation value of the reference data showing peak.

The GA-VSB type equalizer shown in FIG.4 adopts an off-line system which uses the reference signal. Another reason that the GA-VSB type equalizer uses an off-line system is because it performs an NRF process.

Considering simultaneous broadcasting of HDTV and NTSC signals, the GA-VSB type receiver performs an NRF process using a comb filter in order to reduce the NTSC signal to be mixed with the HDTV signal. Because NRF is a subtraction of two signals having full gains, the signal level increases from 8 levels to 15 levels and the carrier-to-noise (C/N) for the 15 level process is decreased by about 3 dB more than the 8 level process. That is, under the 15 level process, a stop & go (SAG) decision-directed algorithm can not be adopted and equalization is performed according to only the reference signal, which causes the convergent speed to deteriorate.

Here, the stop & go (SAG) decision-directed algorithm is described in document [5]: Giorgio Picchi and Giancarlo Prat: "Blind Equalization and Carrier Recovery Using 'Stop-and-Go' Decision-Directed Algorithm" IEEE Trans. on Communications. vol., Com-35, no 9, pp 877–887, Sep. 1987.

Consequently, the off-line equalization driven by the reference signal is needed not only for speedy convergence in the initial state and precise equalization under general conditions but also for a converging operation of the 15-level equalizer under the circumstance where an NTSC signal is mixed with an HDTV signal.

SUMMARY OF THE INVENTION

It is an object of the present invention to provide an equalizing method in which convergence is based on minimizing the symbol error rate in order to effectively remove multipath distortion under the circumstance of NTSC signals being mixed with HDTV signals.

It is another object of the present invention to provide an off-line system equalizer having a simple hardware structure for a digital demodulation system in which NTSC signals are mixed with HDTV signals.

To achieve the first object, there is provided an equalizing method for equalizing a received signal by renewing a filtering coefficient of a filter in an off-line system using a pre-stored reference signal, the method comprising the steps of:

(a) determining whether a signal input to a high definition TV (HDTV) includes a field sync or not;

(b) storing a training sequence in a memory when the field sync is detected in the step (a);

(c) calculating a filtering coefficient according to a predetermined algorithm;

(d) determining the level of the training sequence stored in the step (b) and calculating a symbol error rate (SER) using the pre-stored reference signal;

(e) transmitting the filtering coefficient obtained in the step (c) to the filter when the SER obtained in the step (d) is lower than a predetermined value; and (f) repeatedly performing the steps (c) through (f) until a loop variable equals a loop constant, which indicates the number of off-line operations capable of being performed in a field, while increasing the loop variable when the SER obtained in the step (d) is greater than or equal to a predetermined value.

To achieve the second object, there is provided an equalizer for use in a digital demodulating system, for equalizing a received signal by renewing a filtering coefficient of a filter in an off-line system using reference signals, the equalizer comprising:

a first memory for storing a training sequence carried by the received signal in a field sync term according to a field sync control signal;

a second memory for storing reference signals for 8-level and 15-level processes;

a first filter for filtering the received signal;

a second filter, connected to an output terminal of the equalizer;

a subtractor for subtracting the output of the second filter from the output of the first filter and outputting an equalized signal; and filter coefficient calculating means for:

(1) reading one of the reference signals for the 8-level and 15-level processes according to an NTSC removal filter (NRF) control signal, and reading the training sequence stored in the first memory according to the field sync control signal;

(2) calculating a symbol error rate (SER) of the read reference signal and the read training sequence;

(3) calculating a field coefficient with the calculated SER as a basis for convergence; and (4) supplying the calculated field coefficient to the first and second filters, wherein the field sync control signal is generated during a field period of a field sync segment term, and the NRF control signal indicates whether the received HDTV signal is a signal filtered from an NTSC signal which is mixed with the HDTV signal.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 5:
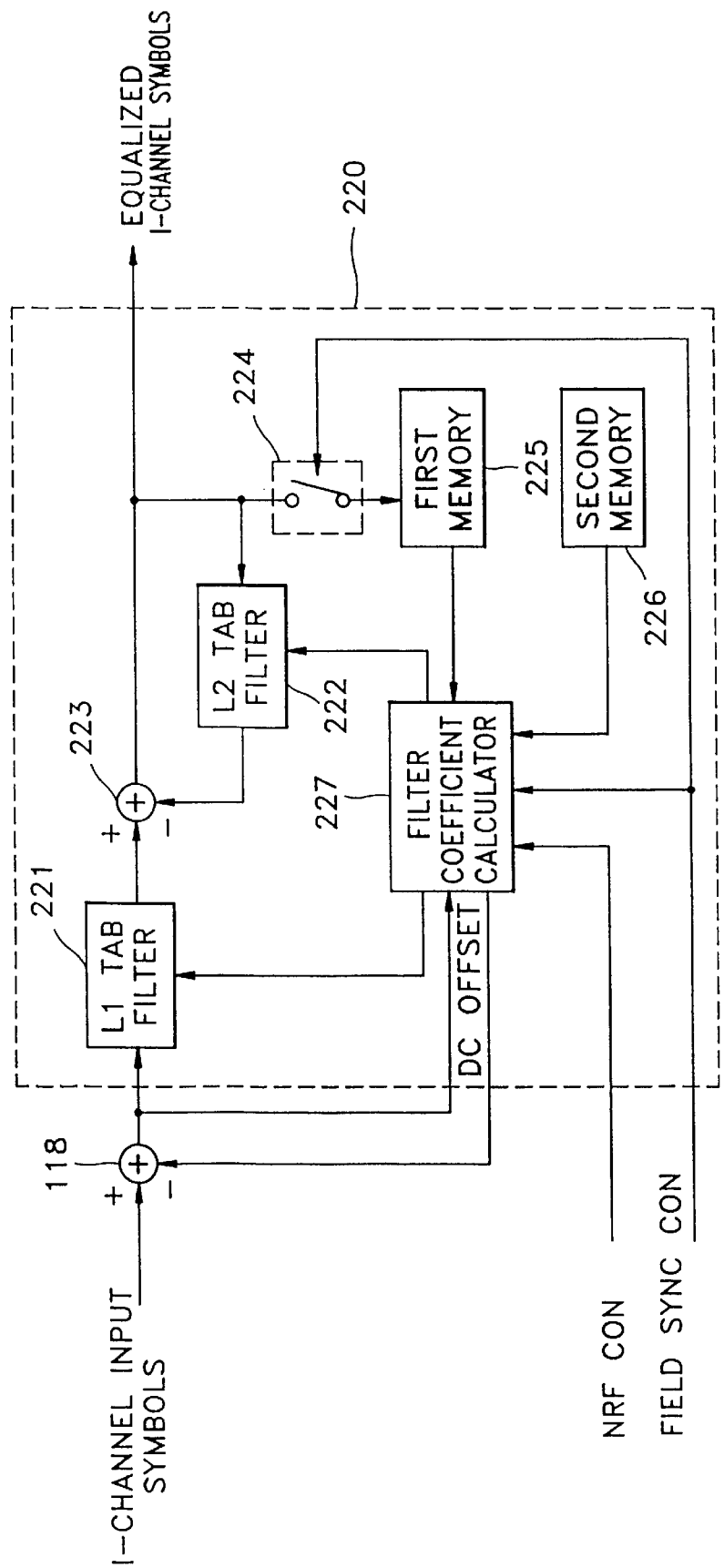
FIG. 5 is a block diagram showing an equalizer according to an embodiment of the present invention.

FIG. 5 is a circuit diagram of a equalizer using an equalizing method according to an embodiment of the present invention.

The equalizer 220 shown in FIG. 5 includes a first filter 221 constituted of L1 tabs (78 tabs), a second filter 222 constituted of L2 tabs (177 tabs), a subtractor 223 for subtracting the feedback output of the second filter 222 from the output of the first filter 221, a first memory 225, embodied in a RAM, for storing the training sequence transmitted during a field sync segment term, a controlling switch 224 for controlling the training sequence to be stored in the first memory 225 according to the field sync segment signal which indicates field sync segment, a second memory 226, embodied in a RAM, for storing the reference signals for 8 levels without undergoing an NRF process and 15 levels when undergoing an NRF process, and a filtering coefficient calculator 227, embodied in a ROM, for reading one of the 8-level and 15-level reference signals stored in the second memory 226 according to the NRF control signal, and calculating the equalizing filtering coefficient using the training sequence stored in the first memory 225 according to the field sync control signal.

The operation of the equalizer shown in FIG. 5 will be described below.

Figure 2:
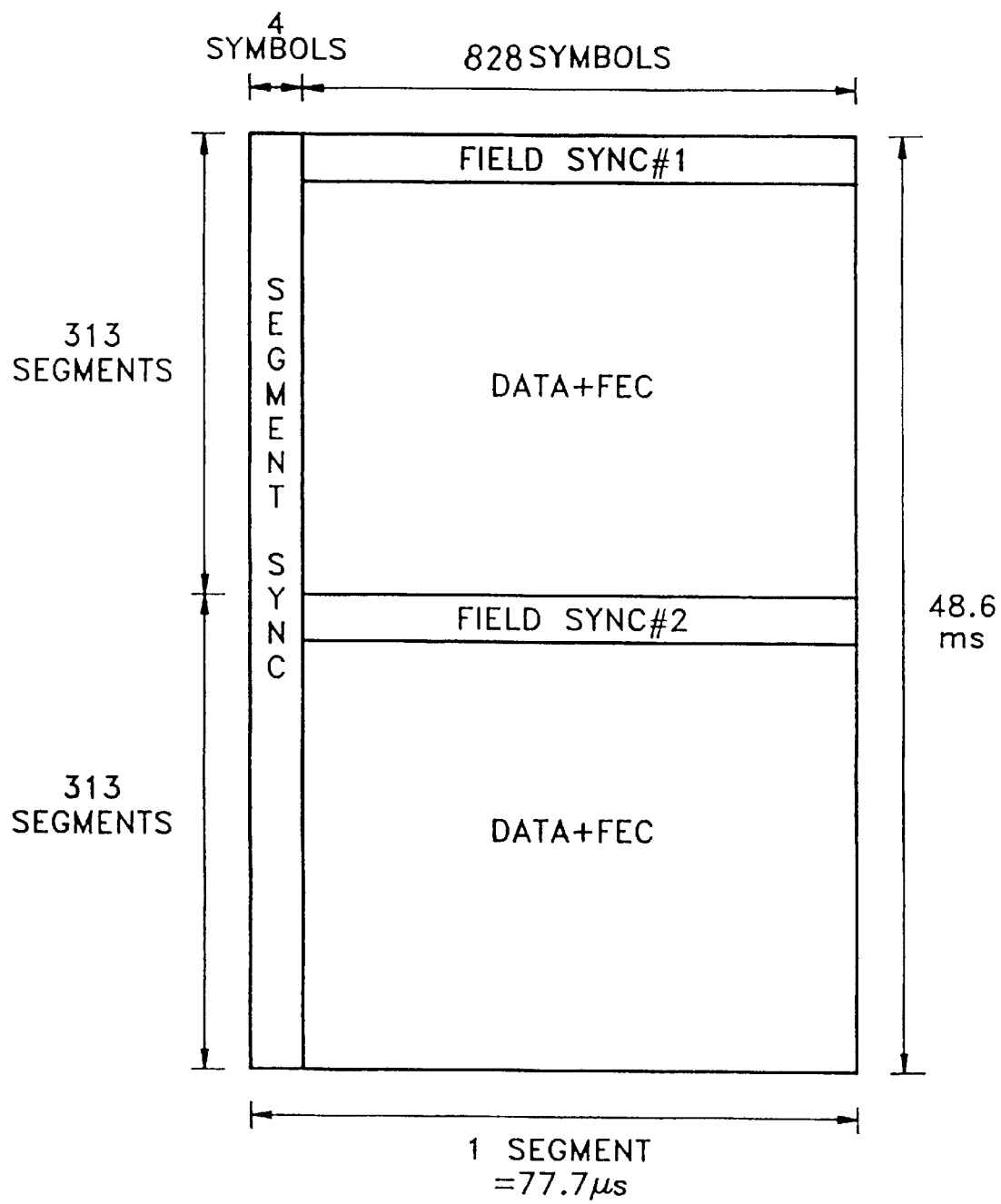
FIG. 2 shows a transmission signal format according to a GA-VSB type receiver.
Figure 3:
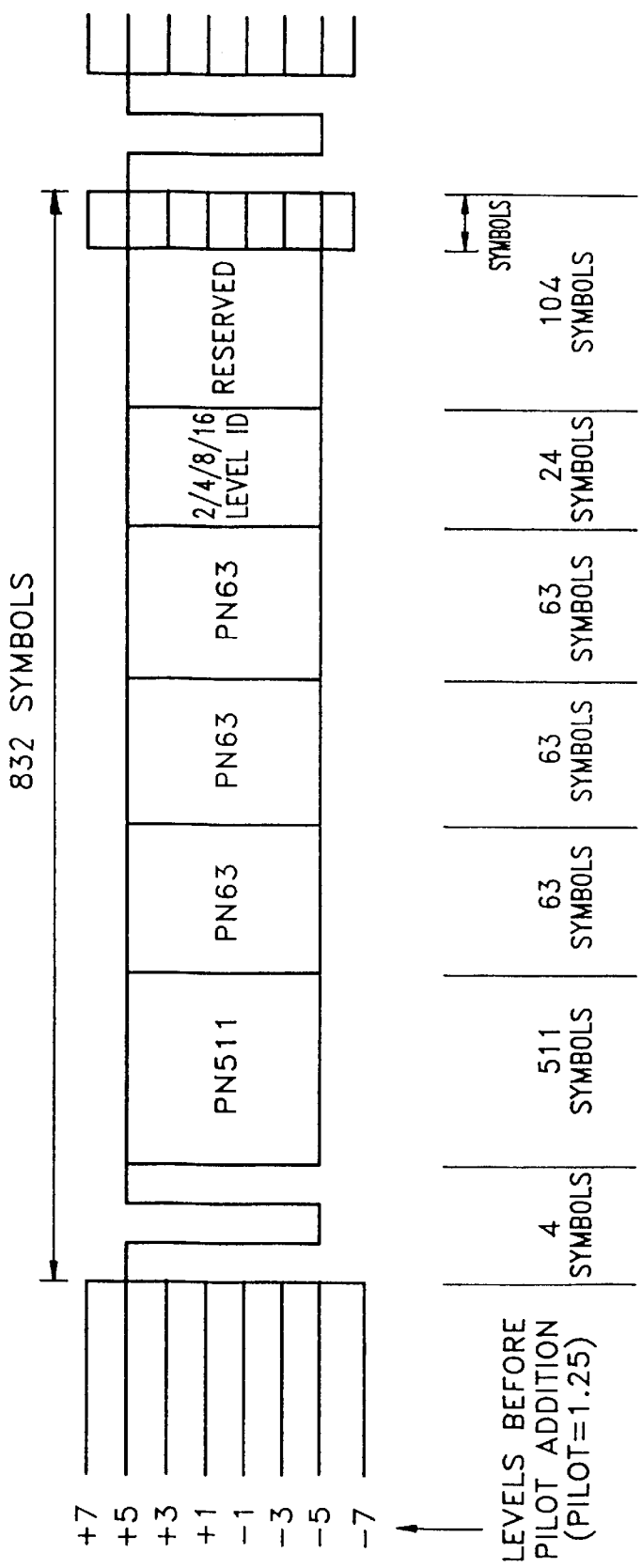
FIG. 3 shows a field sync format according to a GA-VSB type receiver.

As shown in FIGS. 2 and 3, an available training sequence PN 511 is in the two data field sync segments, i.e., Field Sync #1 and Field Sync #2, in a VSB data frame. Therefore, the off-line system equalizer, shown in FIG. 5, stores the training sequence during the field sync segment term in the first memory 225 to be used in the equalizing process.

That is, the first filter 221 receives the I-channel input symbol data from the DC offset subtractor 118, multiplies the filtering coefficient transmitted from the filtering coefficient calculator 227 thereby, and outputs the result to the subtractor 223.

The second filter 222 multiplies the output of the subtractor 223 by the filtering coefficient transmitted from the filtering coefficient calculator 227 and transmits the result to the subtractor 223.

The controlling switch 224 controls the recording of the training sequence transmitted from the subtractor 223 in the first memory 225 according to the field sync con signal. At this time, the field sync con signal is transmitted from the symbol timing and field sync restorer 114 (see FIG. 1).

The reference signals −10, 0, and +10 for a 15-level process used when the input I-channel symbol data undergoes NRF processing in the NTSC detector 116, and the reference signals −5, and +5 for an 8-level process used when NRF processing is not performed, are stored in the second memory 226.

The filter coefficient calculator 227 obtains the filtering coefficients using the LMS algorithms shown by equations 1 through 3 according to the field sync con, calculates the symbol error rate (SER) by comparing the 15-level or 8-level reference signals stored in the second memory 226 with the training sequence stored in the first memory 225, and renews the filtering coefficients by supplying the obtained coefficients to the first and second filters 221 and 222 when the calculated SER is lower than the threshold value.

Figure 1:
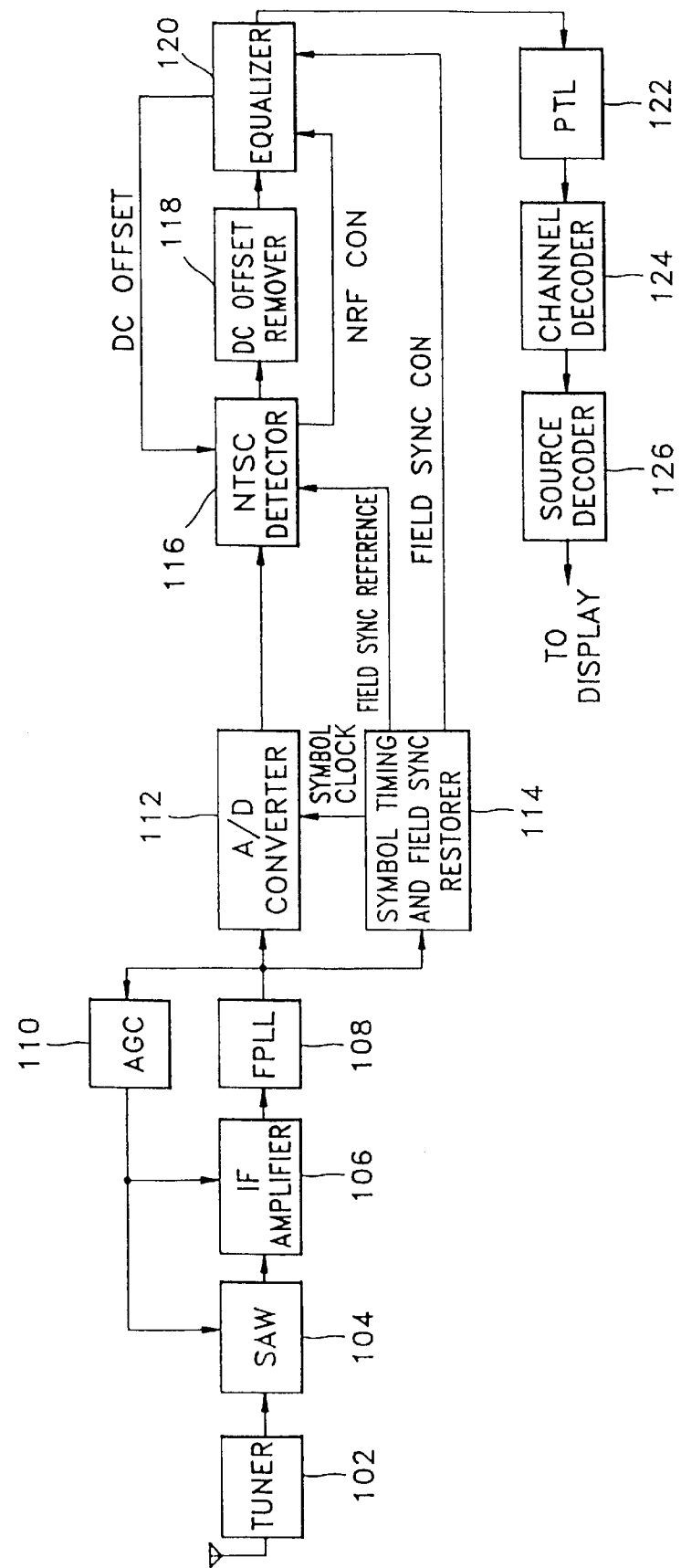
FIG. 1 is a block diagram showing a general GA-VSB type receiver.
Figure 4:
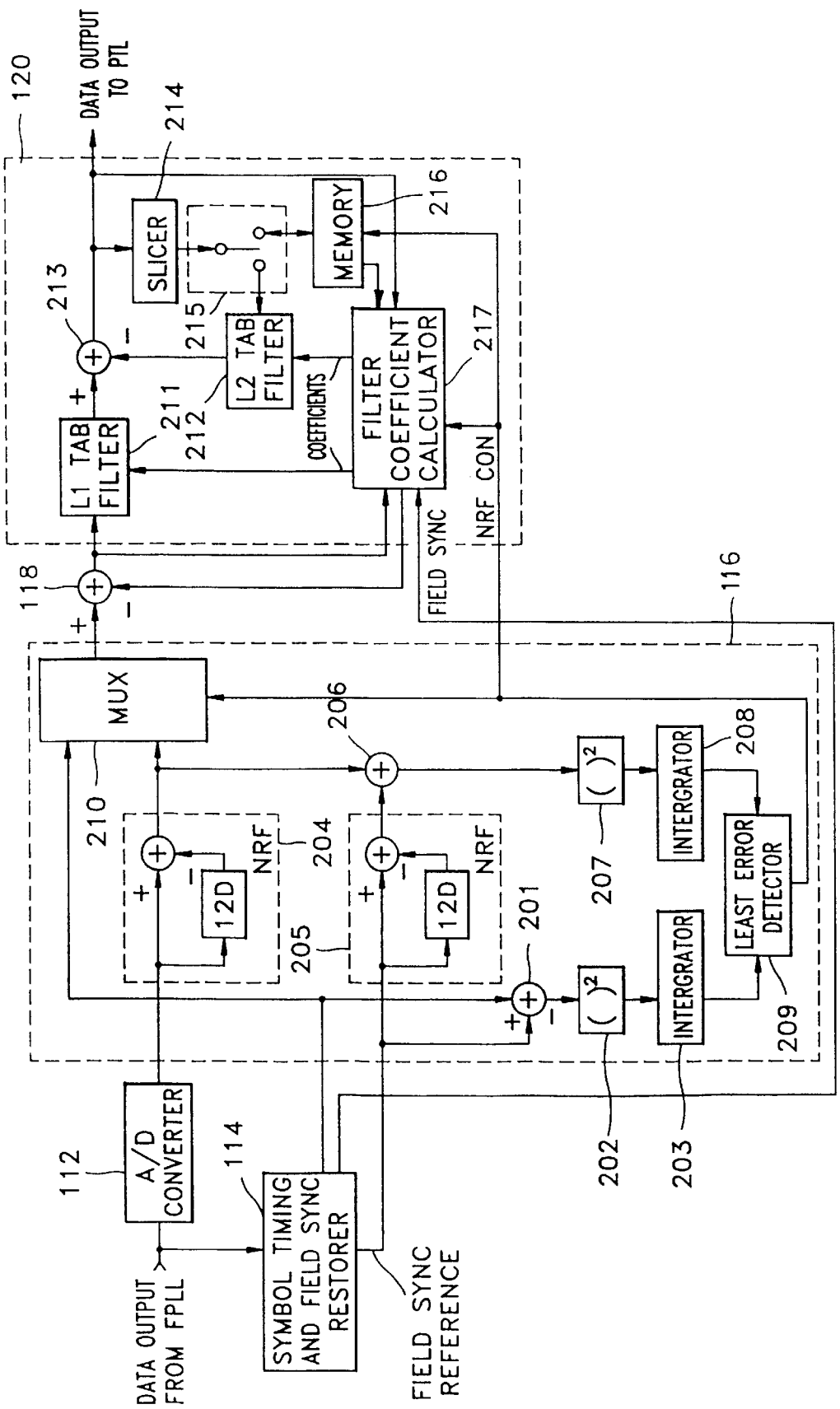
FIG. 4 is a detailed block diagram showing a portion of a conventional HDTV receiver of a GA-VSB type.

Additionally, the filter coefficient calculator 227 calculates the DC offset and transmits it to the DC offset subtractor 118, the operation of which is omitted here because it was described earlier in the background section with reference to FIGS. 1 and 4.

Moreover, the equalizer shown in FIG. 5 can be used not only for the VSB type receiver shown in FIG. 1 but also for all kinds of digital signal demodulating systems adopted as an off-line system using a reference signal.

Furthermore, the equalizer shown in FIG. 5 can be used as an NTSC detector having a different construction from that shown in FIG. 3 as long as it is constructed to output NRF control signals.

Meanwhile, in a digital communication system, an SER is a more important and effective value than the mean square error (MSE) used as a directing post for deciding the degree of convergence for a conventional equalizer. Because the equalized data is error corrected after passing through the PTL, an SER is more important than MSE which does not have a direct effect on the process. That is, when an SER is very large, error correction becomes virtually impossible. In contrast, when an SER is lower than a predetermined value, error correction is possible and thus all signals can be restored. However, an MSE is not directly related to such error correction process.

Therefore, the degree of convergence of the LMS algorithm, i.e., the degree of convergence of an equalizer, for selecting the best filtering coefficient for the equalizer can be obtained from the SER of the training sequence, that is, the equalizing filter is driven when the SER value is at its lowest.

Based on the above, the present invention proposes an equalizing algorithm which causes an equalizer to be converged on the basis of minimizing SER instead of MSE.

Figure 6:
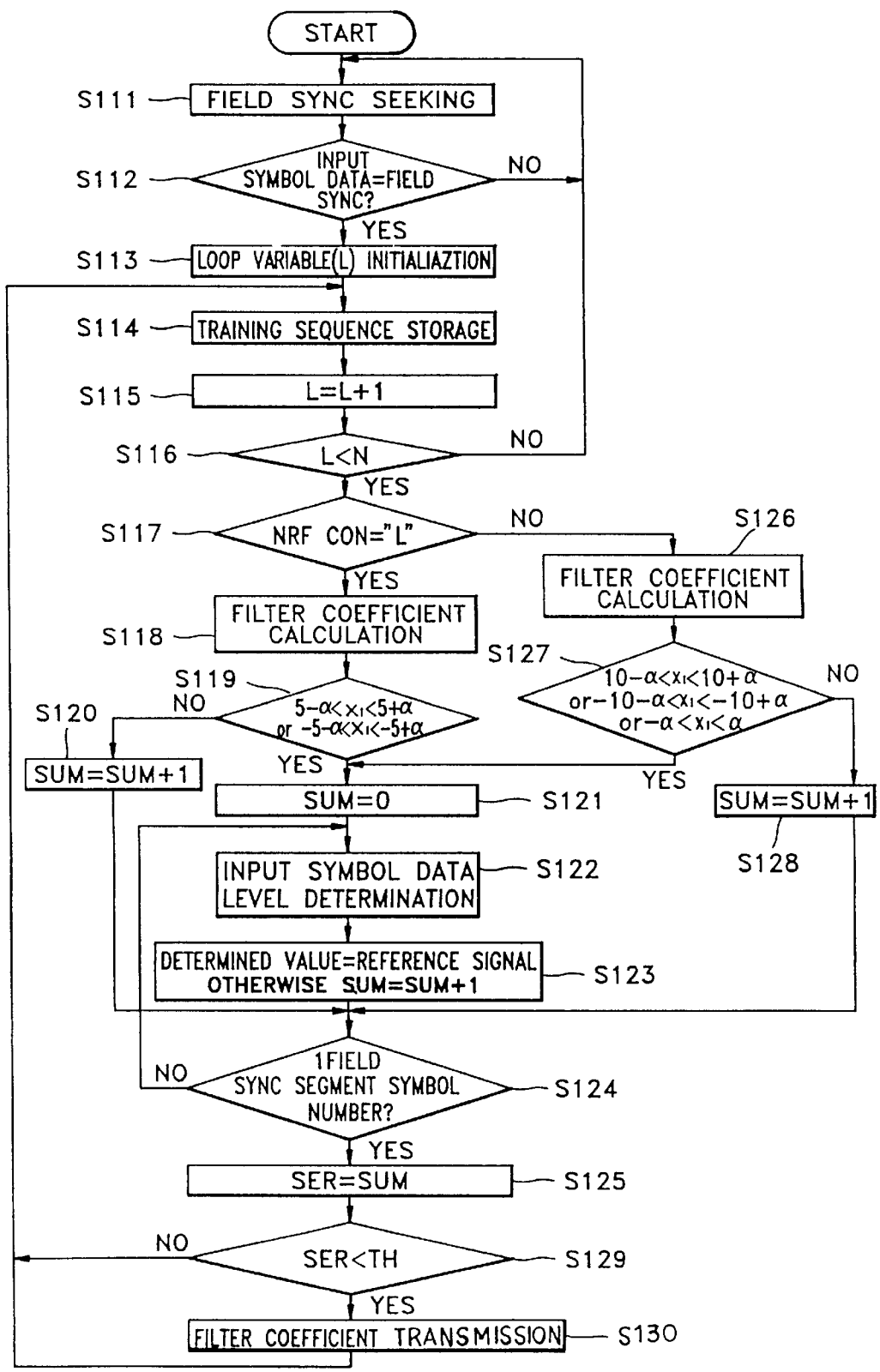
FIG. 6 is a flow chart outlining the equalizing method according to an embodiment of the present invention.

FIG. 6 is a flow chart outlining an equalizing method using a reference signal according to an embodiment of the present invention, which will be described with reference to FIG. 5.

Referring to FIG. 6, first, field sync seeking is performed for revealing the correlation between the training signal PN 511 transmitted from the receiver and the field sync reference signal pre-stored in the symbol timing and field sync restorer 114 in step S111.

Afterwards, the field sync seeking process is continuously performed if the field sync is not detected, or the loop variable L is initialized to be "0" if the field sync is detected, via steps S112 and S113. The training sequence transmitted during the field sync term is stored in the first memory 225 in step S114.

The loop variable L is incremented by 1 in step S115, and it is determined whether the loop variable L is larger than a loop constant N or not in step S116. The loop variable L should be smaller than the loop constant N, which indicates the number of off-line operations capable of being performed in one field. Here, since one segment training sequence is transmitted in every one field, the loop constant N indicates the maximum number of available off-line operations capable of being operated before the following training sequence is input. That is, the state of N≦L means that the following field will be input.

When the loop variable L is smaller than the loop constant N, the logic state of the NRF CON is decided in step S117.

When the logic state of the NRF CON is "low", the I-channel input symbol data doesn't perform NRF processing, and thus the filtering coefficient is calculated using the above Eqs. (1), (2), and (3) in step S118.

After step S118 is completed, it is determined whether the input symbol data ($x_i$) of the equalizer 120, i.e., the training sequence, is between 5−α and 5+α, or between −5−α and −5+α in step S119. Here, as shown in FIG. 3, the levels of the training sequence (PN 511) during the field sync segment term are −5 and +5. The α indicates a weighing value of the reference level.

When the input symbol data is neither between 5−α and 5+α nor between −5−α and −5+α in step S119, one is added to the variable (SUM) indicating the sum of the symbol error rates (SER) in step S120.

In contrast, when the input symbol data is either between 5−α and 5+α or −5−α and −5+α in step S119, the SUM becomes "zero" (S121) and the current input symbol data (training sequence) level is determined in step S122. That is, if the determined value is the reference signal level, the SUM is kept as it is, i.e., SUM=SUM, otherwise, one is added to SUM in step S123.

Next, it is decided whether all determinations are performed regarding the predetermined number of symbols of the field sync segment in step S124. If not, the process is fedback to step S122 for determining the input symbol data level, otherwise, the SUM is substituted for SER in step S125. Accordingly, the predetermined symbol number becomes more than that of the training sequence of the field sync segment.

If the logic state of the NRF CON is "high" in step S117, the input symbol data of the equalizer undergoes NRF processing, and the filtering coefficient is calculated using the above equations (1), (2), and (3) (S126).

Afterwards, the input symbol data level ($x_i$) is determined in step S127, and when $X_i$ is between 10−α and 10+α, −α and +α, or −10−α and −10+α, the SUM is equated to "zero" in step S121, otherwise, one is added to the SUM in step S128, to then go to step S124. Here, the SER calculation for 8-level processing takes place in steps S119 to S125, and the SER calculation for 15-level processing takes place in steps S126 to S128 and steps S121 to S125.

Because most digital communication systems include an error correction process, the amount of error below a predetermined value can be corrected perfectly. Therefore, when the detected SER is smaller than the predetermined value TH in step S129, error correction is regarded to be possible and thus the filtering coefficient obtained in S118 and S126 is transmitted to the first filter 221 and the second filter 222, and the off-line coefficient renewal process is continued in step S130, otherwise, the process is fedback to step S115 wherein the loop variable L is increased by one.

Figure 7:
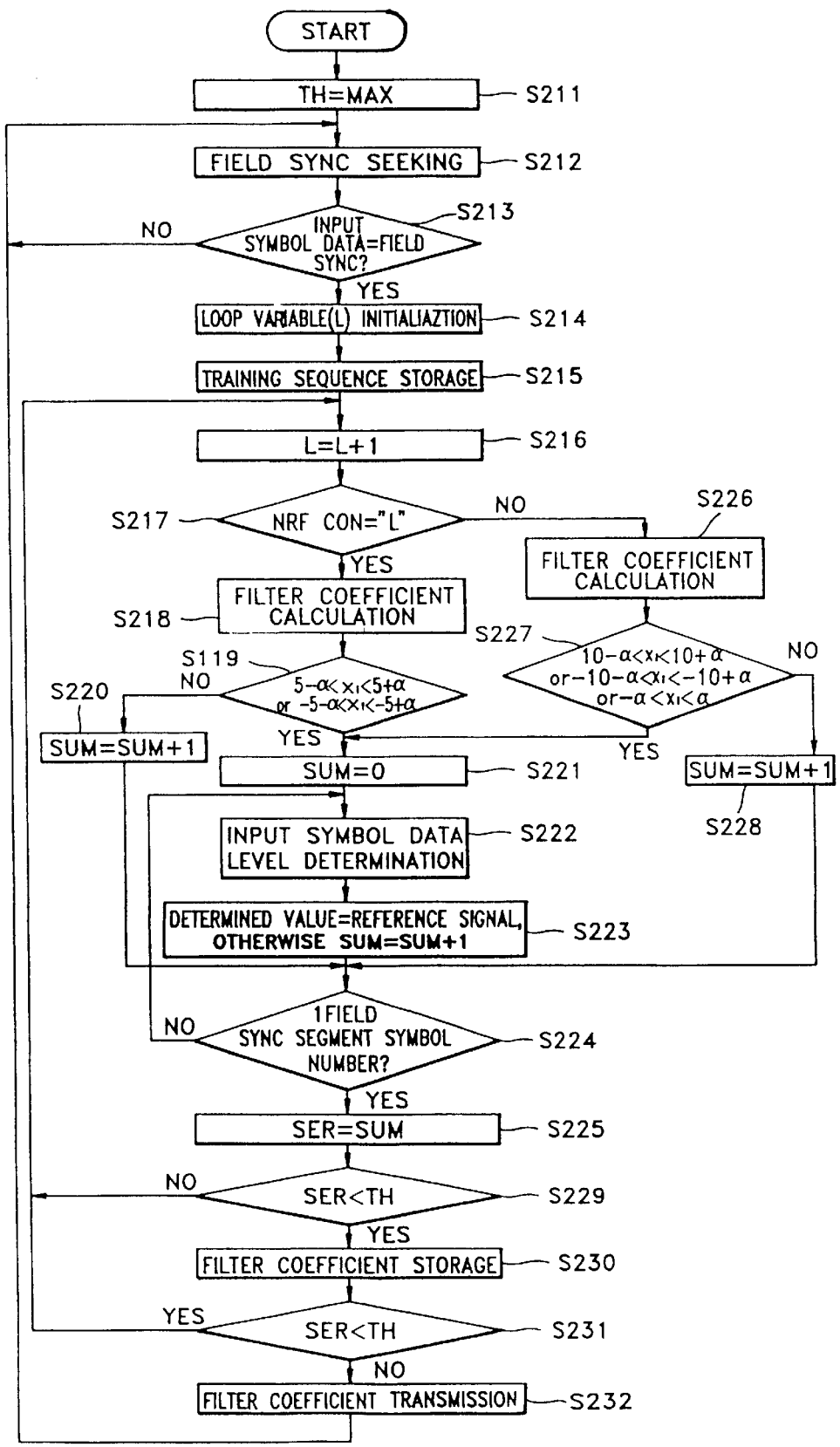
FIG. 7 is a flow chart outlining the equalizing method according to another embodiment of the present invention.

FIG. 7 is a flow chart showing the equalizing method using a reference signal according to another embodiment of the present invention, which is constructed to transmit the filtering coefficient having the lowest SER to the filter of the equalizer during the field term.

Referring to FIG. 7, the threshold value (TH) is set as a sufficiently large value (MAX), e.g., fifty percent, in step S211, and field sync seeking is performed in step S212. Because a predetermined signal is transmitted from the receiver during the field sync segment term, the field sync can be detected by determining the correlation between the reference signal stored in the receiver and the predetermined signal.

If the field sync is not detected, the field sync seeking step S213 is continued, and if the field sync is detected, the loop variable L is initialized to zero and the training sequence transmitted during the field sync segment term is stored in the first memory 225 in step S215.

In addition, the logic state of NRF CON is determined in step S217 after the loop variable L is increased by one in S216.

If the logic state of the NRF CON is "low", the I-channel input symbol data doesn't perform NRF processing, and thus the filtering coefficient is calculated using the above equations (1), (2), and (3) in step S218.

When step S218 is completed, it is determined whether the input symbol data $x_i$ of the equalizer 120, i.e., the training sequence, is between either $5-\alpha$ and $5+\alpha$ or $-5-\alpha$ and $-5+\alpha$ in step S219.

If the input symbol data is neither between $5-\alpha$ and $5+\alpha$ nor $-5-\alpha$ and $-5+\alpha$ in step S219, SUM indicating the sum of the symbol error rates (SER) is increased by one in step S220.

In contrast, if the input symbol data is between either $5-\alpha$ and $5+\alpha$ or $-5-\alpha$ and $-5+\alpha$, SUM is equated to zero in step S221, and the input symbol data (training sequence) level is determined in step S222. Here, if the determined level is the same as that of the reference signal, SUM is kept as it is, i.e., SUM=SUM, otherwise, SUM is increased by one in step S223.

Next, it is determined whether all determinations are performed regarding the predetermined number of symbols of the field sync segment in step S224. If not, the process is fedback to step S222, and if so, SUM is substituted by SER in step S225. Here, the predetermined symbol number is more than or equal to that of the training sequence of the field sync segment.

If the logic state of NRF CON is "high" in step S217 the input symbol data of the equalizer undergoes NRF processing, and the filtering coefficient is calculated from the input symbol data of the equalizer using the above equations (1), (2), and (3)in step S226.

Afterwards, the input symbol data level ($x_i$) is determined in step S227, and when $X_i$ is between $10-\alpha$ and $10+\alpha$, $-\alpha$ and $\alpha$, or $-10-\alpha$ and $-10+\alpha$, SUM is set to "zero" in step S221, otherwise, one is added to SUM in steps S227 and S228 to then go to step S224. Here, the SER calculation for 8-level processing takes place in steps S219 to S225, and the SER calculation for 15-level processing takes place in steps S226 to S228 and steps S221 to S225.

Because most digital communication systems include an error correction process, the amount of error below a predetermined value can be corrected perfectly. Therefore, when the obtained SER is smaller than TH which is the predetermined value MAX of step S211, the filtering coefficient obtained in steps S218 and S226 is stored in the inner buffer of the filtering coefficient calculator 227 in step S230.

Here, it is determined whether the loop variable is smaller than a predetermined loop constant N in step 231. IF the loop variable is smaller than the loop constant N, indicating the number of loop variables L capable of performing off-line operation in one field, the process is fedback to step S216 where the lowest SER is obtained by regulating the filtering coefficient before the loop variable L is equal to the loop constant N.

Such a process is continued until L=N, wherein the filtering coefficient, when the SER stored in the inner buffer is lowest, is transmitted to the first filter 211 and second filter 212. After the transmission of the filtering coefficient, a series of processes starting from the field seeking step 212 is repeated in step S232.

As described above, the equalizing methods and equalizers according to embodiments of the present invention determine the degree of convergence of the equalizing algorithm using the SER and thus can effectively remove or reduce the multipath distortion due to the NTSC signal being mixed with the HDTV signal.

What is claimed is:

1. An equalizing method for equalizing a received signal by renewing a filtering coefficient of a filter in an off-line system using a pre-stored reference signal, said method comprising the steps of:
   (a) determining whether a signal input to a high definition TV (HDTV) includes a field sync or not;
   (b) storing a training sequence in a memory when the field sync is detected in said step (a);
   (c) calculating the filtering coefficient according to a predetermined algorithm;
   (d) determining the level of said training sequence stored in said step (b) and calculating a symbol error rate (SER) using said pre-stored reference signal;
   (e) transmitting said filtering coefficient obtained in said step (c) to said filter when said SER obtained in said step (d) is lower than a predetermined value; and
   (f) repeatedly performing said steps (c) through (f) until a loop variable equals a loop constant, which indicates a number of off-line operations capable of being performed in a field, while increasing said loop variable when said SER obtained in said step (d) is greater than or equal to the predetermined value.

2. An equalizing method as claimed in claim 1, wherein said step (d) comprises the steps of:
   (d1) comparing said training sequence with said reference signal;
   (d2) determining the level of said training sequence when said training sequence is identical to said reference signal in said step (d1); and
   (d3) counting a result during a predetermined number of symbol terms and outputting the counted value as an SER when said training sequence is not identical to said reference signal in said step (d1).

3. An equalizing method as claimed in claim 1, wherein said predetermined algorithm is a least mean square (LMS) algorithm.

4. An equalizing method for equalizing a received HDTV signal by renewing a filtering coefficient of a filter in an off-line system using reference signals, said method comprising the steps of:
   (a) determining whether said received HDTV signal includes a field sync;
   (b) storing a training sequence in a memory when said field sync is detected in said step (a);
   (c) determining whether said received HDTV signal has an NTSC signal mixed with an HDTV signal;
   (d) if said received HDTV signal does not include the NTSC signal, calculating a first filtering coefficient for an 8-level process using a first predetermined algorithm;
   (e) calculating a first symbol error rate (SER) by determining the level of said training sequence stored in said step (b) using a first pre-stored reference signal for an 8-level process;
   (f) renewing the filtering coefficient of the filter with said first filtering coefficient obtained in said step (d) when said first SER obtained in said step (e) is less than a predetermined value;

(g) repeatedly performing said steps (d) through (g) until a loop variable is equal to a loop constant which indicates the number of off-line operations capable of being performed in a field while increasing said loop variable when said SER obtained in said step (e) is larger than or equal to said predetermined value;

(h) calculating a second filtering coefficient for a 16-level process using a second predetermined algorithm if said received HDTV signal includes the NTSC signal mixed with said HDTV signal;

(i) calculating a second symbol error rate (SER) by determining the level of said training sequence stored in said step (b) using a second prestored reference signal for a 16-level process;

(j) renewing the filtering coefficient of the filter with said second filtering coefficient obtained in said step (h) when said second SER obtained in said step (i) is less than a predetermined value; and (k) repeatedly performing said steps (h) through (k) until said loop variable equals said loop constant while increasing said loop variable when said second SER obtained in said step (i) is greater than or equal to said predetermined value.

5. An equalizing method as claimed in claim 4, wherein said step (e) comprises the steps of:

(e1) comparing said training sequence with said first prestored reference signal;

(e2) determining the level of said training sequence level when said training sequence is identical to said first prestored reference signal for an 8-level process in said step (e1); and (e3) counting the result during a predetermined number of symbol terms and outputting the counted value as said first SER when said training sequence is identical to said first prestored reference signal in said step (e1).

6. An equalizing method as claimed in claim 4, wherein said step (i) comprises the steps of:

(i1) comparing said training sequence with said second prestored reference signal;

(i2) determining the level of said training sequence when said training sequence is identical to said second prestored reference signal in said step (i1); and (i3) counting the result during a predetermined number of symbol terms and outputting the counted value as said second SER when said training sequence is not identical to said reference signal in said step (i1).

7. An equalizing method as claimed in claim 4, wherein said first predetermined algorithm used in step (d) and said second predetermined algorithm used in step (h) are least mean square (LMS) algorithms.

8. An equalizing method for equalizing a received HDTV signal by renewing a filtering coefficient of a filter in an off-line system using a prestored reference signal, said method comprising the steps of:

(a) setting a first symbol error rate (SER) to a predetermined value;

(b) determining whether said received HDTV signal includes a field sync;

(c) storing a training sequence in a memory when said field sync is detected in said step (b);

(d) calculating the filtering coefficient according to a predetermined algorithm;

(e) outputting a second symbol error rate (SER) by determining the level of said training sequence stored in said step (c) using said prestored reference signal;

(f) storing said filtering coefficient obtained in said step (d) when said second SER obtained in said step (e) is less than the predetermined value set in said step (a); and (g) repeatedly performing said steps (d) through (g) within a loop constant which indicates the number of off-line operations capable of being performed in a field while increasing a loop variable, and renewing the filtering coefficient of the filter with the filtering coefficient stored in said step (f) when said second SER is at its lowest value.

9. An equalizing method as claimed in claim 8, wherein said step (e) comprises the steps of;

(e1) comparing said training sequence with said prestored reference signal;

(e2) determining said training sequence level when said training sequence is identical to said reference signal for an 8-level process in said step (e1); and (e3) counting the result during a predetermined number of symbol terms and outputting the counted value as said second SER when said training sequence is not identical to said reference signal in said step (e1).

10. An equalizing method as claimed in claim 8, wherein said predetermined algorithm is a least mean square (LMS) algorithm.

11. An equalizing method for equalizing a received signal by renewing a filtering coefficient of a filter in an off-line system using reference signals, said method comprising the steps of:

(a) setting a symbol error rate (SER) to a first predetermined value;

(b) determining whether said received HDTV signal includes a field sync;

(c) storing a training sequence in a memory when said field sync is detected in said step (b);

(d) determining whether said received HDTV signal has an NTSC signal mixed with an HDTV signal;

(e) calculating a first filtering coefficient for an 8-level process using a first predetermined algorithm if said received HDTV signal includes the NTSC signal;

(f) outputting a first symbol error rate (SER) by determining the level of said training sequence stored in said step (c) using a first reference signal for an 8-level process;

(g) storing said first filtering coefficient obtained in said step (e) when said first SER obtained in said step (e) is less than a second predetermined value;

(h) repeatedly performing said steps (e) through (h) within a loop constant which indicates the number of off-line operations capable of being performed in a field while increasing a loop variable, and renewing the filtering coefficient of said filter with the first filtering coefficient stored in said step (g) when said SER is at its lowest value;

(i) calculating a second filtering coefficient for a 16-level process using a second predetermined algorithm if said received HDTV signal includes the NTSC signal;

(j) outputting a second symbol error rate (SER) by determining the level of said training sequence stored in said step (c) using a second prestored reference signal for a 16-level process;

(k) storing said second filtering coefficient obtained in said step (i) when said second SER obtained in said step (j) is smaller than said second predetermined value; and (l) repeatedly performing said steps (i) through (l) within said loop constant while increasing said loop variable, and renewing the filtering coefficient of the filter with the second filtering coefficient stored in said step (k) when the second SER obtained in said step (j) is at its lowest value.

12. An equalizing method as claimed in claim 11, wherein said step (f) comprises the steps of:

(f1) comparing said training sequence with said first reference signal;

(f2) determining said training sequence level when said training sequence is identical to said first reference signal for an 8-level process in said step (f1); and (f3) counting the result during a predetermined number of symbol terms and outputting the counted value as said first SER when said training sequence is not identical to said first reference signal in said step (f1).

13. An equalizing method as claimed in claim 11, wherein said step (j) comprises the steps of:

(j1) comparing said training sequence with said second reference signal;

(j2) determining said training sequence level when said training sequence is identical to said second reference signal in said step (j1); and (j3) counting the result during a predetermined number of symbol terms and outputting the counted value as said second SER when said training sequence is not identical to said second reference signal in said step (j1).

14. An equalizing method as claimed in claim 11, wherein said first predetermined algorithm used in said step (e) and said second predetermined algorithm used in said step (i) are least mean square (LMS) algorithms.

15. An equalizer for use in a digital demodulating system, for equalizing a received signal by renewing a filtering coefficient of a filter in an off-line system using reference signals, said equalizer comprising:

a first memory for storing a training sequence carried by said received signal in a field sync term according to a field sync control signal;

a second memory for storing a first reference signal for an 8-level process and a second reference signal for a 15-level process;

a first filter for filtering said received signal;

a second filter having an input connected to an output terminal of said equalizer;

a subtractor for subtracting the output of said second filter from the output of said first filter and outputting an equalized signal; and filter coefficient calculating means for:

(1) reading one of said first reference signal and said second reference signal according to an NTSC removal filter (NRF) control signal, and reading said training sequence stored in said first memory according to said field sync control signal;

(2) calculating a symbol error rate (SER) of the read reference signal and the read training sequence;

(3) calculating a field coefficient with the calculated SER as a basis for convergence; and (4) supplying the calculated field coefficient to said first and second filters, wherein said field sync control signal is generated during a field period of a field sync segment term, and said NRF control signal indicates whether said received HDTV signal includes an NTSC signal.

16. An equalizer as claimed in claim 15, wherein said equalizer further comprises memory controlling means for controlling said training sequence to be stored in said first memory according to said field sync control signal.

17. An equalizer as claimed in claim 15, wherein said first memory is constituted of a RAM for storing and reading said training sequence.

18. An equalizer as claimed in claim 15, wherein said second memory stores the first reference signal as signals of +5 and −5 for the 8-level process and the second reference signal as signals of −10, 0, and +10 for the 15-level process.

19. An equalizer as claimed in claim 15, wherein said filter coefficient calculating means calculates said filtering coefficient using a least mean square algorithm.

20. An improved HDTV receiver of the type including: a tuner for selecting a high definition TV (HDTV) signal and outputting an IF signal; an amplifier for amplifying said IF signal; a frequency and phase locked loop circuit for restoring a carrier wave from said amplified IF signal and restoring a base band signal using the restored carrier wave, thereby producing a restored signal; a restorer for restoring symbol timing from the restored signal and outputting a field sync control signal; an NTSC detector for performing an NTSC removing filter (NRF) process on said restored signal and outputting an NRF control signal indicating whether the NRF process is performed or not and an output signal which is said restored signal which has been subjected to said NRF process; an equalizer for equalizing the output signal of the NTSC detector, thereby producing an equalized signal; a phase tracking loop circuit for detecting a phase error of the equalized signal and outputting a result; and a decoder for decoding the output of said phase tracking loop circuit, wherein said equalizer comprises:

a first memory for storing a training sequence carried by the output signal of said NTSC detector during a field sync term according to a field sync control signal;

a second memory for storing a first reference signal for an 8-level process and a second reference signal for a 15-level process;

a first filter for filtering the output of said NTSC detector;

a second filter having an output connected to an output of said equalizer;

a subtractor for subtracting the output of said second filter from the output of said first filter and outputting an equalized signal; and filter coefficient calculating means for:

(1) reading one of said first reference signal for the 8-level process and said second reference signal for the 15-level processes according to said NRF control signal, and reading said training sequence stored in said first memory according to said field sync control signal;

(2) calculating a symbol error rate (SER) between the read reference signal and the read training sequence;

(3) calculating a field coefficient with the calculated SER as a basis for convergence; and (4) supplying the calculated field coefficient to said first and second filters.

21. An equalizer as claimed in claim 20, wherein said equalizer further comprises memory controlling means for controlling said training sequence to be stored in said first memory according to said field sync control signal.

22. An equalizer as first memory claim 20, wherein said first memory is constituted of a RAM for storing and reading said training sequence.

23. An equalizer as claimed in claim 20, wherein said second memory stores the first reference signal as signals of +5 and −5 for an 8-level process and the second reference signal as signals of −10, 0, and +10 for the 15-level process.

24. An equalizer as claimed in claim 20, wherein said filter coefficient calculating means calculates said filtering coefficient using a least mean square algorithm.

* * * * *